Patented Feb. 24, 1948

2,436,558

UNITED STATES PATENT OFFICE 2,436,558

PROCESS OF PRODUCING CATALYSTS CONTAINING BARIUM PEROXIDE

Kenneth C. Edson, Los Angeles, Calif., and Frank E. Fisher, Pawhuska, Okla., assignors to Skelly Oil Company, Tulsa, Okla., a corporation of Delaware No Drawing. Original application December 7, 1942, Serial No. 468,110, now Patent No. 2,419,343, dated April 22, 1947. Divided and this application January 10, 1947, Serial No. 721,462

5 Claims. (Cl. 252—253)

The present invention relates to improved processes for the production of catalysts containing barium peroxide.

More specifically, the invention relates to a process of improving the activity of aromatization catalysts containing catalytically active insoluble compounds of a metal selected from the group consisting of chromium, molybdenum and vanadium, preferably the oxides or sesquioxides of said metals, by incorporating therewith a certain amount of barium peroxide, $BaO_2$.

In our Patent No. 2,380,035 of July 10, 1945, we have described and claimed processes for aromatizing hydrocarbons by the use of catalysts prepared in accordance with the present invention. This patent issued on an application Serial No. 488,888 filed May 28, 1943, as a continuation-in-part of an application, Serial No. 468,111, filed December 7, 1942, now abandoned.

The present application is a division of an application, Serial No. 468,110, also filed on December 7, 1942. Said original application was divided into an application, Serial No. 541,118, June 19, 1944, now Patent No. 2,419,342, covering the catalysts themselves, while application Serial No. 468,110, now Patent No. 2,419,343, contains claims to other processes of preparing these catalysts.

The present application covers that portion of application Serial No. 468,110 which is particularly concerned with the use of barium nitrite to incorporate barium peroxide with the other components of the catalysts.

In accordance with the present invention, it has been found that the activity of an aromatization catalyst may be greatly enhanced by associating barium peroxide therewith. In accordance with the particular embodiment of this invention, the aromatization catalyst with which the barium peroxide is associated may comprise a suitable carrier, such as activated alumina, in admixture with an oxide or other compound of chromium, vanadium or molybdenum, or mixtures thereof.

One of the objects of the invention therefore is to prepare a catalyst by depositing upon a suitable carrier a catalytically active insoluble compound of a metal selected from the group consisting of chromium, molybdenum and vanadium, preferably the oxides, and more specifically the sesquioxides of said metals, together with a certain amount of barium peroxide.

A further object of the invention is to effect the incorporation of barium compounds capable of yielding barium peroxide with a carrier upon which there has already been deposited the oxide, sesquioxide or other compound of chromium, molybdenum or vanadium or mixtures thereof under such conditions as to avoid any undesired reactions between the added barium compound and the already present compound of chromium, molybdenum or vanadium. For the oxides or other compounds of chromium, molybdenum, or vanadium may be substituted other catalytic materials suitable for use in an aromatization process, such as the oxides or other compounds of titanium, zirconium, cerium, hafnium, thorium, columbium, tantalum, tungsten, uranium, or the like, or mixtures thereof.

In accordance with one embodiment of this invention, there is prepared, in a preliminary step, a dry catalytic material comprising a catalytically active material such as a sesquioxide of chromium, molybdenum or vanadium deposited on a suitable carrier such as granulated activated alumina, the latter being present in major amounts. To this dry catalytic material is then added a solution of a salt of barium, such as barium nitrate, according to the method hereinafter more definitely described, and the thus produced catalytic material is dried, and then heated in a stream of air or oxygen to convert the barium compound to barium peroxide.

The present invention is therefore particularly concerned with the manufacture of catalytic materials made in such a manner as to have present in the final product a catalyst comprising a major amount of a carrier and a minor amount of an aromatization catalyst having barium peroxide in association therewith.

It appears that the activity of the catalyst of this invention is attributable to the two minor ingredients, that is to say the aromatization catalyst (i. e. the oxide of chromium, molybdenum or vanadium), and the barium peroxide, since it has been found that the activity of the finished catalyst is greater than the activity of one containing either of the minor ingredients alone on the same carrier.

It has been found by the inventors that the activity of the catalysts of the present invention varies considerably with variations in the method of preparation and also to some extent with the purity of the reagents used. For example, it was found that a catalyst made with the use of bauxite as a carrier was somewhat inferior to one made with a high grade of activated alumina. Therefore it is evident that for the optimum results purified starting materials should be employed. The preparation of the catalyst may be accomplished in a number of ways with a corresponding variation in its activity and the methods described hereinbelow are those which produce catalysts of high activity and yet are relatively simple in their method of preparation.

The chromium, molybdenum or vanadium oxides may be incorporated with the carrier by impregnating the carrier with a suitable solution of a salt or acid of the corresponding metal. For example the carrier may be impregnated with an aqueous solution of chromic acid, ammonium chromate, chromium nitrate, ammonium molybdate, ammonium vanadate or the like in accordance with the well known prior art processes. The resulting material may then be dried, and thereafter heated to the decomposition temperature of the compound or salt employed to form within the carrier the oxide or sesquioxide of chromium, molybdenum or vanadium.

As for the barium peroxide, this is derived from a solution of a salt such as barium nitrite, $Ba(NO_2)_2$. The mixture is then heated to decomposition temperatures to form the oxide. Thereafter the catalyst containing the barium oxide is heated to a temperature of from 500° to 600° C. or thereabouts, in a stream of air or oxygen, so as to convert the barium oxide into barium peroxide.

Catalysts prepared by the procedure hereinbelow described evidently possess a large total contact surface of high activity not obtainable by either active ingredient alone. This activity is maintained after many alternate periods of use and reactivation as evidenced by the fact that the catalyst may be repeatedly reactivated by passing air or other oxidizing gas over the spent particles to burn off deposits of carbonaceous material at temperatures below 900° C. without material loss of catalytic activity.

The following example of preparation of the catalysts peculiar to the present invention is given to indicate their novelty and utility although not for the purpose of limiting the invention in exact agreement with the data introduced. In the following example chromium compounds are used to illustrate the preferred way in which the catalyst may be prepared. The process indicated in the following example will work equally well for the corresponding compounds of molybdenum, vanadium, or certain other metals as hereinbefore and hereinafter specified.

*Example*

High grade activated alumina comminuted to form particles of from 10 to 12 mesh is impregnated with an aqueous solution of a water-soluble chromium compound of such a concentration and in such amounts as to yield about 8 per cent of chromium sesquioxide on decomposition, and the resulting mixture is evaporated to dryness, and then heated to about 250° C. for about an hour in order to decompose said chromium compound with the corresponding formation of chromium sesquioxide. Suitable water-soluble chromium compounds are chromic acid, chromic nitrate and ammonium chromate.

In case of molybdenum or vanadium, their water-soluble salts are used, which may include molybdates or vanadates, such as those of ammonium.

The material thus obtained is thereafter impregnated with an aqueous solution of barium nitrite of such concentration and in such amounts as to be capable of yielding eventually about 8 per cent of barium oxide in the composition, and this mixture is evaporated to dryness. The catalyst is then placed in the reaction chamber and heated to a temperature of about 550° C. for about two hours in a stream of air for the purpose of decomposing the barium nitrite into barium oxide, and then thereafter to oxidize the oxide to the peroxide. At the end of this time the catalyst is ready for use.

When processing normal heptane in a once-through operation in accordance with the method disclosed and claimed in our Patent No. 2,380,035, with a conversion temperature of about 560° C., a 48% or better conversion of normal heptane into aromatic compounds was attained.

The catalysts of the present invention are characterized by the high activity and freedom from poisoning; moreover if they should become somewhat inactivated as a result of the deposition thereon of carbon or carbonaceous or tarry material they can readily be restored substantially to their original activity by the expedient of heating the same to about the conversion temperature and up to 900° C. or thereabout in a current of an oxygen-containing gas such as air, or air diluted with inert gases, so as to burn off the carbonaceous material and to restore the barium oxide to the peroxide stage in case it should have become reduced to the oxide. The catalyst after such regeneration may then be used for treating further quantities of aliphatic hydrocarbons so as to convert them into aromatic hydrocarbons with about the same number of carbon atoms.

In the foregoing example, the sesquioxides of chromium, molybdenum, or vanadium or mixtures thereof have been specifically referred to as one of the active ingredients of the catalyst of the invention. It is not intended that this invention should be limited thereto, however, since other aromatization or dehydrogenating and cyclicizing catalysts may be substituted therefor, such as the oxides or other compounds of titanium, zirconium, cerium, hafnium, thorium, columbium, tantalum, tungsten or uranium, or mixtures thereof. Also, even though activated alumina has been specified as the preferred carrier or support for the catalyst of this invention, other suitable supports or carriers may be employed such as magnesium oxide, aluminum oxide, bauxite, bentonite clays, montmorillonite clays, kieselguhr, crushed firebrick, crushed silica, glauconite, etc.

Saving for themselves such equivalents as will be apparent to those familiar with the art to which this invention falls, applicants claim:

1. Process of preparing a catalyst for hydrocarbon conversion which comprises impregnating a carrier with an aqueous solution of a water-soluble compound of an element from the group consisting of chromium, molybdenum and vanadium, drying the resulting mixture and heating it to a temperature sufficiently high to produce an oxide of said element, impregnating the product thus obtained with an aqueous solution of barium nitrite and heating it under oxidizing conditions to a temperature sufficiently high to decompose said nitrite to barium oxide and to oxidize the latter to barium peroxide.

2. Process of preparing a catalyst for hydrocarbon conversion which comprises impregnating a carrier with an aqueous solution of a water-soluble compound from the group consisting of ammonium chromate, ammonium molybdate and ammonium vanadate, drying the resulting mixture and heating it to a temperature sufficiently high to decompose said compound and produce an oxide from the group consisting of chromium oxide, molybdenum oxide and vanadium oxide, impregnating the product thus obtained with an aqueous solution of barium nitrite and heating it under oxidizing conditions to a temperature sufficiently high to decompose said nitrite to barium oxide and to oxidize the latter to barium peroxide.

3. The process as defined in claim 1, in which the carrier is aluminum oxide.

4. Process of enhancing the activity of a catalyst comprising a compound from the group consisting of oxides of chromium, molybdenum and vanadium, which comprises wetting said catalyst with an aqueous solution of barium nitrite, drying the resulting mixture and heating it under oxidizing conditions to a temperature sufficiently high to decompose said nitrite to barium oxide and to oxidize the latter to barium peroxide.

5. Process of preparing a catalyst for hydrocarbon conversion which comprises impregnating aluminum oxide with an aqueous solution of ammonium chromate, evaporating the resulting mixture to dryness, thereafter heating it to a temperature of about 250° C. for a time sufficient to decompose the ammonium chromate into chromium sesquioxide; impregnating the product thus obtained with an aqueous solution of barium nitrite, evaporating the mixture to dryness and then heating it with free access of oxygen to a temperature of about 550° C. for about two hours to form barium peroxide by decomposition of said nitrite and oxidation of the thereby resulting barium oxide.

KENNETH C. EDSON.
FRANK E. FISHER.